(12) United States Patent
Ejdehag et al.

(10) Patent No.: US 8,984,718 B2
(45) Date of Patent: Mar. 24, 2015

(54) HANDLE HEIGHT ADJUSTMENT DEVICE OF WALK-BEHIND POWER TOOL, A HANDLE ASSEMBLY AND A WALK-BEHIND POWER TOOL COMPRISING SUCH A DEVICE

(75) Inventors: Fredrik Ejdehag, Vaggeryd (SE); Fredrik Edholm, Jönköping (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 14/355,632

(22) PCT Filed: Nov. 2, 2011

(86) PCT No.: PCT/SE2011/051311
§ 371 (c)(1),
(2), (4) Date: May 1, 2014

(87) PCT Pub. No.: WO2013/066223
PCT Pub. Date: May 10, 2013

(65) Prior Publication Data
US 2014/0290006 A1    Oct. 2, 2014

(51) Int. Cl.
B62D 51/00 (2006.01)
F16C 11/10 (2006.01)
(Continued)

(52) U.S. Cl.
CPC ............... *F16C 11/10* (2013.01); *A01D 34/68* (2013.01); *A01D 34/824* (2013.01); *A01B 76/00* (2013.01); *A01D 34/00* (2013.01); *B62B 5/064* (2013.01); *Y10S 16/90* (2013.01)
USPC ..................... 16/437; 16/426; 16/436; 16/900

(58) Field of Classification Search
USPC ........ 16/437, 436, 113.1, 429, 426, 900, 334, 16/330, 306, 307, 352; 15/410, 411; 56/10.8, 14.8, 11.1, 11.3, 16.7, 2, 56/DIG. 18; 180/19.3, 19.2, 19.1, 324, 180/332, 333, 336; 172/42; 280/47.371; 403/92, 93, 96, 108
See application file for complete search history.

(56) References Cited

U.S. PATENT DOCUMENTS 3,694,855 A    10/1972  Meyer et al.
3,840,231 A *  10/1974  Moore .......................... 473/245
(Continued)

FOREIGN PATENT DOCUMENTS

CN    201219376 Y    4/2009
DE    4428373 C1     2/1996
GB    2460446 A      12/2009

OTHER PUBLICATIONS
International Preliminary Report on Patentability of PCT/SE2011/051311 issued May 6, 2014.
(Continued)

*Primary Examiner* — Chuck Mah
(74) *Attorney, Agent, or Firm* — Nelson Mullins Riley & Scarborough LLP

(57) ABSTRACT

A handle height adjustment device of a handle assembly (2) of a walk-behind power tool (1). The handle height adjustment device (100) comprises a first toothed disk member (200), a second toothed disk member (300), and a disk interconnecting member. The disk interconnecting member (400) is arranged to be connected to the first toothed disk member (200) by means of a first interconnection mechanism (401), which first interconnection mechanism (401) inhibits relative movement between the disk interconnecting member (400) and the first toothed disk member (200) along an axis of rotation (500) of the handle height adjustment device (100), and which first interconnection mechanism (401) allows the disk interconnecting member to rotate relative the first toothed disk member about the axis of rotation (500). The disk interconnecting member (400) is arranged to be threadably connected to the second toothed disk member (300) by means of a second interconnection mechanism (402). The application also concerns a handle assembly and a walk-behind power tool comprising such a device.

13 Claims, 5 Drawing Sheets

(51) Int. Cl.
*A01D 34/68* (2006.01)
*A01D 34/82* (2006.01)
*A01B 76/00* (2006.01)
*A01D 34/00* (2006.01)
*B62B 5/06* (2006.01)

(56) References Cited

U.S. PATENT DOCUMENTS

| | | | |
|---|---|---|---|
| 4,294,027 A | 10/1981 | Edwards | |
| 4,842,098 A * | 6/1989 | Yuen | 182/22 |
| 5,018,405 A | 5/1991 | Chiu | |
| 5,062,179 A | 11/1991 | Huang | |
| 5,074,448 A | 12/1991 | Wu | |
| 5,168,601 A * | 12/1992 | Liu | 16/445 |
| D374,017 S | 9/1996 | Chunn et al. | |
| 5,765,857 A | 6/1998 | Hsiao | |
| 6,098,492 A * | 8/2000 | Juchniewicz et al. | 74/551.3 |
| 6,101,678 A | 8/2000 | Malloy et al. | |
| 6,345,836 B1 * | 2/2002 | Wu | 280/651 |
| 6,499,172 B1 * | 12/2002 | McCracken | 15/97.1 |
| 6,616,174 B2 | 9/2003 | Bierma | |
| 6,886,852 B2 | 5/2005 | Cheng et al. | |
| 7,496,990 B2 * | 3/2009 | Qiao | 16/437 |
| 7,624,998 B2 | 12/2009 | Barlow et al. | |
| 8,209,816 B2 * | 7/2012 | Heger et al. | 16/334 |
| 2005/0001116 A1 * | 1/2005 | Vogt | 248/177.1 |
| 2005/0046130 A1 | 3/2005 | Cheng et al. | |
| 2005/0227824 A1 * | 10/2005 | Wu et al. | 482/62 |
| 2006/0053762 A1 | 3/2006 | Stover et al. | |
| 2014/0112702 A1 * | 4/2014 | Mighells | 403/92 |

OTHER PUBLICATIONS

International Search Report of PCT/SE2011/051311 mailed May 7, 2012.
Written Opinion of PCT/SE2011/051311 mailed May 7, 2012.

\* cited by examiner

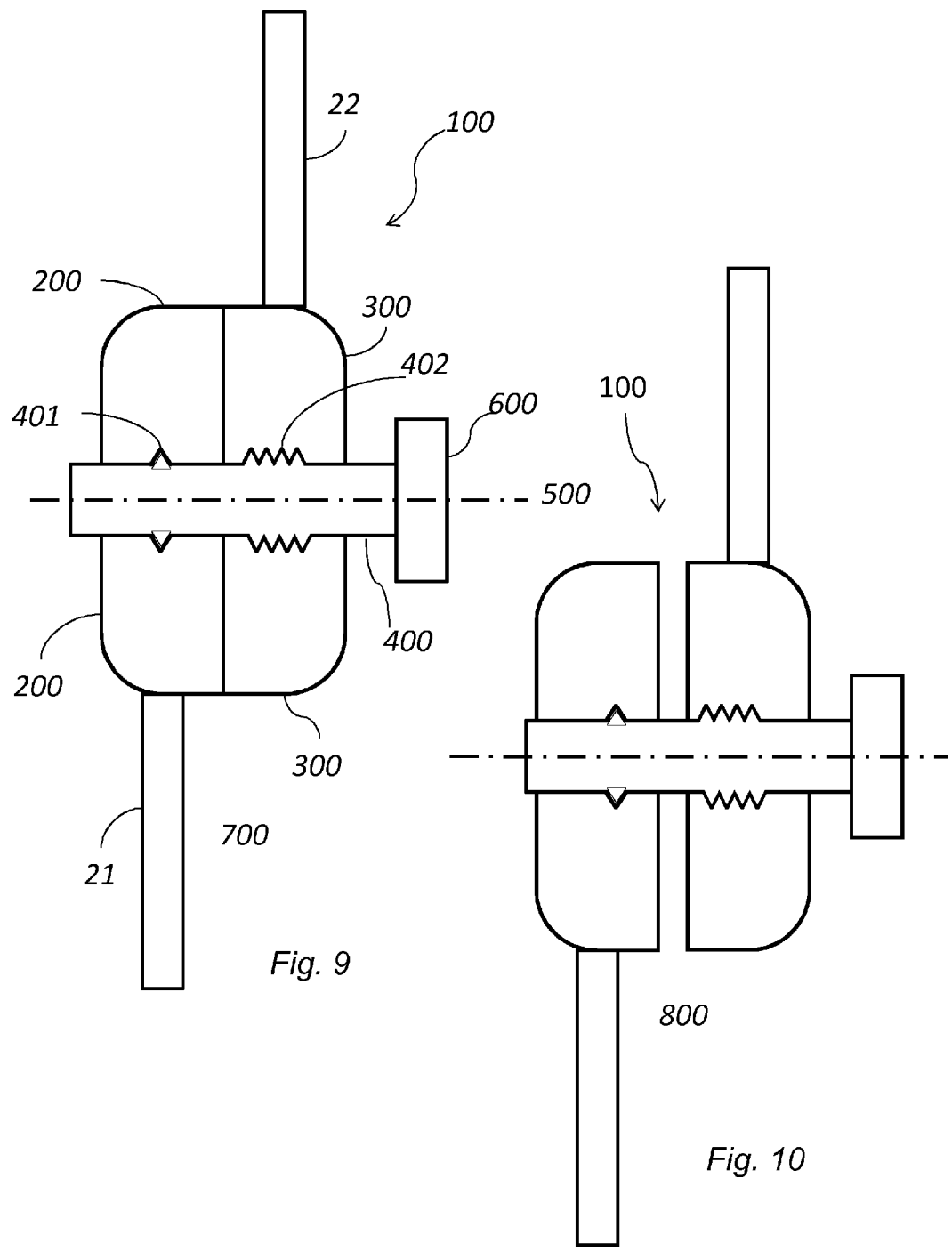

HANDLE HEIGHT ADJUSTMENT DEVICE OF WALK-BEHIND POWER TOOL, A HANDLE ASSEMBLY AND A WALK-BEHIND POWER TOOL COMPRISING SUCH A DEVICE

TECHNICAL FIELD

This invention relates to walk behind power tools, such as walk behind lawn mowers. Especially, the invention deals with a handle height adjustment device of a walk behind power tool.

BACKGROUND OF THE INVENTION

Walk-behind power tools, such as, lawn mowers, snow throwers, dethatchers, aerators, sod cutters, tillers, flail mowers or the like are well known in the art. Typically, a walk-behind power tool includes a handle assembly attached to a tool body, and extending rearwardly and upwardly from the tool body.

In order to provide a handle assembly which is convenient for operators of various sizes, the handle assemblies may be provided with handle height adjustment devices.

There is a need for an improved handle height adjustment device.

SUMMARY OF THE INVENTION

An objective of the present invention is to provide an improved handle height adjustment device of a handle assembly of a walk behind power tool. The handle height adjustment device shall be easy to manufacture at a low cost, be robust and provide a rigid feeling. Furthermore it shall be easy and convenient to use.

According to a first aspect of the solution, the objective is at least partially achieved by means of a handle height adjustment device of a handle assembly of a walk behind power tool, which height adjustment device comprises a first toothed disk member arranged to be affixed to a first arm element of the handle assembly, a second toothed disk member arranged to be affixed to a second arm element of the handle assembly, a disk interconnecting member extending along an axis of rotation of the handle height adjustment device. The disk interconnecting member is operable to move the handle height adjustment device between a locked state in which the first and second toothed disk members intermesh, and an open state in which the first toothed disk member is rotatable relative to the second toothed disk member about the axis of rotation. Rotation of the disk interconnecting member in a first direction about the axis of rotation moves the handle height adjustment device towards the locked state, and rotation of the disk interconnection member in a second direction, opposite to the first direction, moves the handle height adjustment device towards the open state. The disk interconnecting member is arranged to be connected to the first toothed disk member by means of a first interconnection mechanism, which first interconnection mechanism inhibits relative movement between the disk interconnecting member and the first toothed disk member along the axis of rotation, and which first interconnection mechanism allows the disk interconnecting member to rotate relative the first toothed disk member about the axis of rotation. The disk interconnecting member is arranged to be threadably connected to the second toothed disk member by means of a second interconnection mechanism.

Thanks to the configuration of the first and second interconnection mechanisms, a handle height adjustment device is provided in which the first disk member is actively separated from the second disk member upon rotation of the disk interconnecting member in a loosening direction. Previously known devices have used a spring element in order to achieve such active separation. The present invention thus provides a simpler solution, which requires fewer parts. The handle height adjustment device according to the present invention may thus be easier to manufacture and may be manufactured at a lower cost than previously known devices. Furthermore, since no spring is needed, assembly of the handle height adjustment device may be simplified.

According to an embodiment the first interconnection mechanism comprises a snap-fit connection. Thereby the first disk member is easily attached to the disk interconnecting member.

A handle height adjustment device according any of the preceding claims, wherein the second interconnection mechanism comprises male threads provided on a portion of the disk interconnecting member, and corresponding female threads provided in a hole of the second toothed disk member.

According to an embodiment, the disk interconnecting member is affixed to a knob. Thereby rotation of the disk interconnecting member is made easy.

According to an embodiment the disk interconnecting member and the knob are integrally formed.

According to an embodiment the first toothed disk member is integrally formed with the first arm element of the handle assembly. Thereby, a rigid feeling in the handle assembly may be achieved, since few separate parts are used.

According to an embodiment the second toothed disk member is integrally formed with the second arm element of the handle assembly. Thereby, a rigid feeling in the handle assembly may be achieved, since few separate parts are used.

According to an embodiment the first toothed disk member and the first arm element are made from a plastic material. According to an embodiment the second toothed disk member and the second arm element are made from a plastic material. Thereby, manufacture of the disk members and the arm elements may be made easy. The disk members and the arm elements may e.g. be performed by means of injection molding.

According to a second aspect, a handle assembly of a walk behind power tool is provided which handle assembly comprises a handle height adjustment device according the first aspect.

According to an embodiment of the second aspect, the handle assembly comprises two handle height adjustment devices according to the invention, wherein the axes of rotation of the handle height adjustment devices coincide.

According to an embodiment of the second aspect, the disk interconnecting members of the handle height adjustment devices are integrally formed.

According to a third aspect, a walk behind power tool is provided, which walk behind power tool comprises a handle assembly having a handle height adjustment device according to the first aspect.

BRIEF DESCRIPTION OF THE DRAWINGS

The invention will be understood and appreciated more fully from the following detailed description, taken in conjunction with the drawings, in which:

FIG. 9 is a schematic cross sectional view of a handle height adjustment device according to the invention, in a locked state, FIG. 10 is a schematic cross sectional view of the handle height adjustment device of FIG. 9, in an open state.

DESCRIPTION OF PREFERRED EMBODIMENTS

Figure 1:
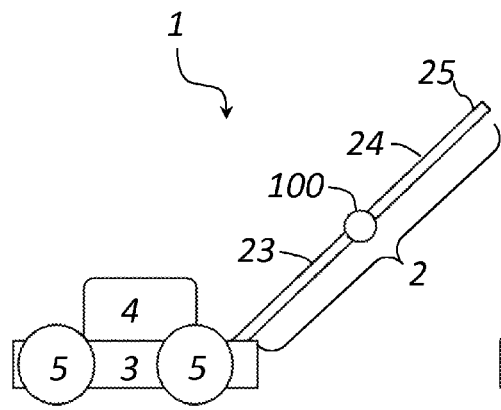
FIG. 1 is a schematic side view of a walk-behind lawn mower comprising handle height adjustment device according to the invention, showing the handle assembly in a first position.

The present invention will be described more fully hereinafter with reference to the accompanying drawings, in which preferred embodiments of the invention are shown. The invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

FIG. 1 is a schematic side view of a walk-behind power tool 1 according to an embodiment of the present invention. The walk-behind power tool 1 may be a walk-behind lawn mower 1. Alternatively the walk behind garden tool may be any other type of walk-behind power tool, for example, but not limited to, a snow thrower, a dethatcher, an aerator, a sod cutter, or the like.

Herein, a walk behind garden tool 1 embodied as a walk behind lawn mower 1 will be used to illustrate and elucidate the invention.

As illustrated in FIG. 1, the walk-behind lawn mower 1 comprises a body 3 with a prime mover 4 arranged to drive a working member, such as a rotating cutting blade. The prime mover 4 may be a combustion engine, an electric motor, or any other type of actuator.

Ground engaging wheels 5 are provided to support the body 3 and enable movement of the walk-behind power tool 1.

A handle assembly 2 is provided at the rear of the body 3 to enable an operator to guide the walk-behind power tool 1. The handle assembly 2 comprises a lower frame 23 and an upper frame 24. The lower frame 23 is connected to the body 3, whereas the upper frame 24 comprises a grip portion 25, configured to be gripped by a user.

The lower frame 23 and the upper frame 24 are connected to each other via a coupling mechanism, comprising a handle height adjustment device 100.

The handle height adjustment device 100 provides a possibility for an operator to adjust a working position of the handle assembly 2.

The handle height adjustment device 100 enables pivoting of the upper frame 24 relative to the lower frame 23, about an axis of rotation 500.

Figure 2:
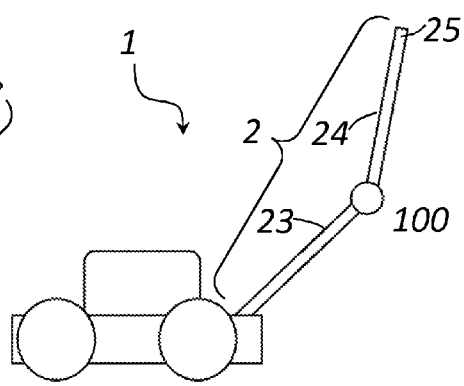
FIG. 2 is another schematic side view of a walk behind lawn mower comprising handle height adjustment device according to the invention, showing the handle assembly in a second position.

FIGS. 1 and 2 show two alternative working positions of a handle assembly. In the working position illustrated in FIG. 2, the grip portion is positioned farther from the ground than in the working position illustrated in FIG. 1.

The handle height adjustment device 100 has an open state, in which relative rotation between the upper frame and the lower frame is enabled.

The handle height adjustment device also has a locked state, in which relative rotation between the upper frame and the lower frame is inhibited. As schematically illustrated by FIGS. 3 and 4, the handle assembly 2 may have various configurations.

Figure 3:
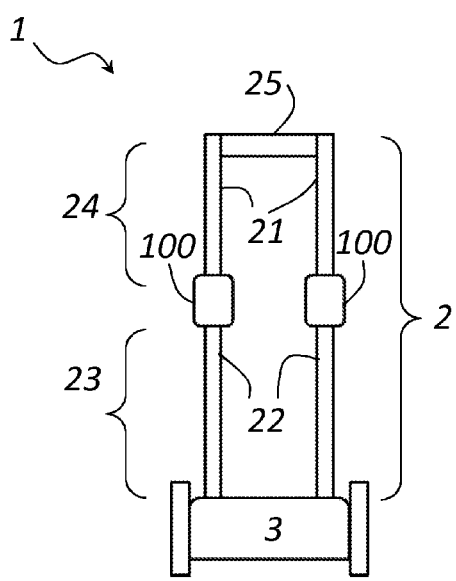
FIG. 3 is a schematic front view of a walk behind lawn mower comprising a handle assembly adjustment device according to an embodiment of the invention.

In FIG. 3, a handle assembly 3 having a U-shape configuration is shown.

Figure 4:
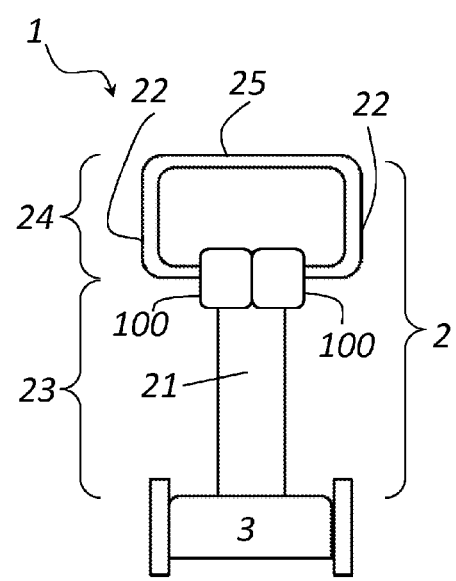
FIG. 4 is a schematic front view of a walk behind lawn mower comprising a handle assembly adjustment device according to another embodiment of the invention.

In FIG. 4, a handle assembly 3 having an hourglass configuration is illustrated.

Figure 5:
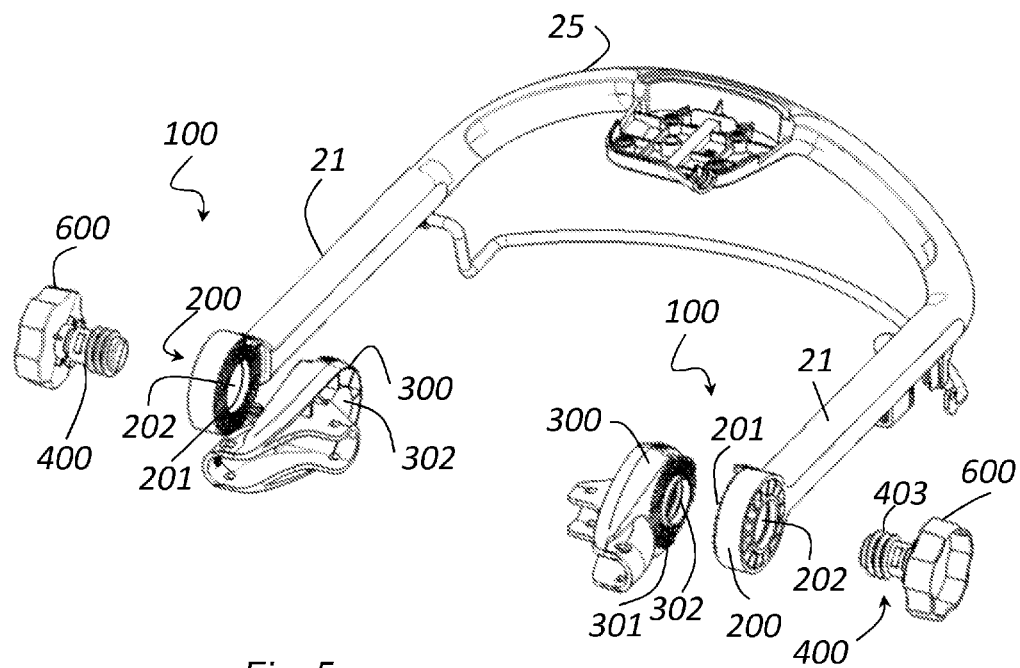
FIG. 5 is an exploded view of a portion of handle assembly comprising a handle height adjustment device according to an embodiment of the invention.
Figure 6:
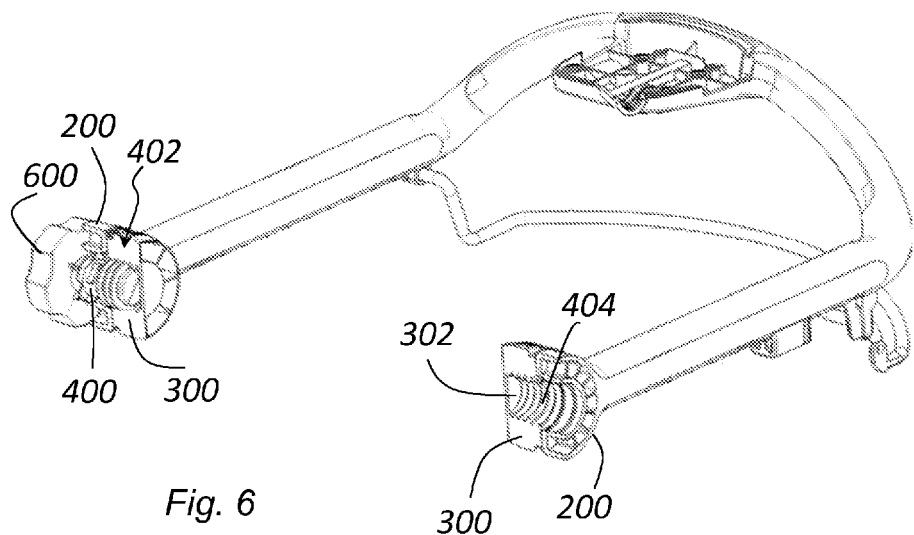
FIG. 6 is a partly broken away perspective view of the handle height adjustment device of FIG. 5.

FIGS. 5 and 6 illustrate an exemplary embodiment of a handle height adjustment device of a handle assembly having a U-shape configuration.

Figure 7:
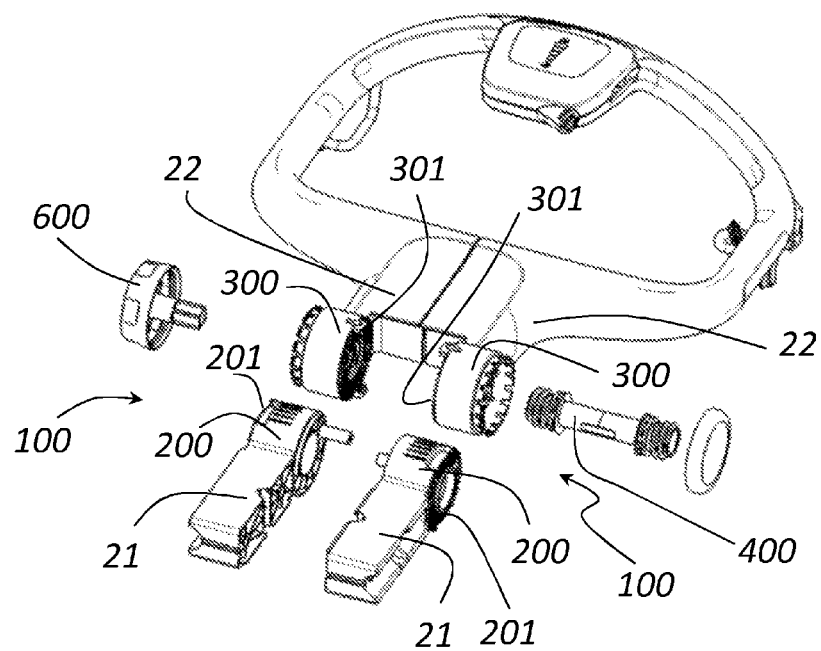
FIG. 7 is an exploded view of a portion of a handle assembly comprising a handle height adjustment device according to an embodiment of the invention.
Figure 8:
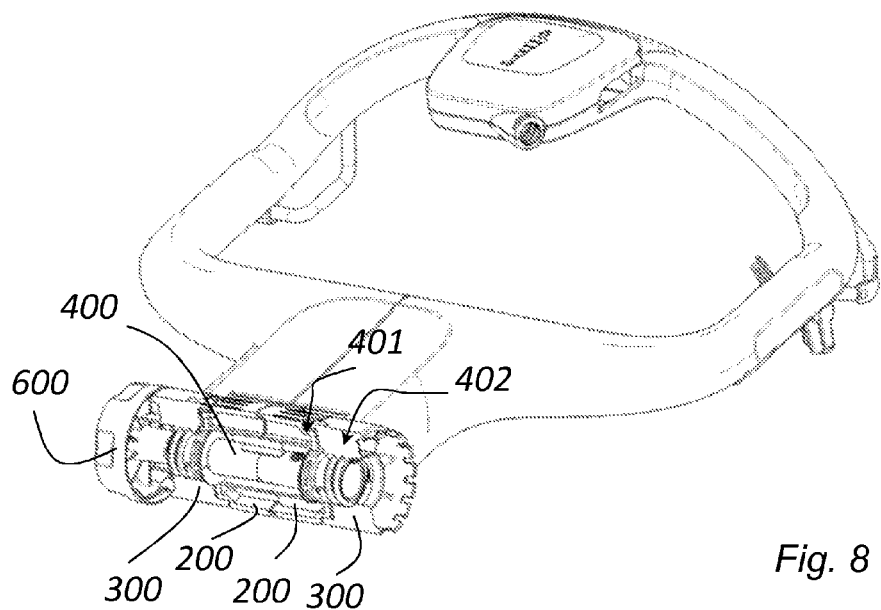
FIG. 8 is a partly broken away perspective view of the handle height adjustment arrangement of FIG. 7.

FIGS. 7 and 8 illustrate an exemplary embodiment of two handle height adjustment devices 100 of handle assembly 2 having an hourglass configuration.

As shown in FIGS. 5 and 6, a handle assembly 2 may comprise two handle height adjustment devices 100.

The two handle height adjustment devices are preferably pivotable about a common axis of rotation 500.

According to embodiments herein, a handle height adjustment device comprises a first disk member 200 which is connected to a first arm element 21 of the handle assembly.

In the embodiment shown in FIGS. 5 and 6, the first arm element 21 is part of an upper frame 24 of the handle assembly 2.

The first disk member may be integrally formed with the first arm element.

The first disk member may be integrally formed with the first arm element by means of injection molding.

The first disk member may be made of a plastic material.

A toothed surface 201 of the first disk member may be provided with radially extending teeth.

According to the embodiment shown in FIGS. 5 and 6, the first disk member 200 has a through hole 202.

According to embodiments herein, a handle height adjustment device comprises a second disk member 300 which is connected to a second arm element 22 of the handle assembly 2.

In the embodiment shown in FIGS. 5 and 6, the second arm element 22 is part of a lower frame 23 of the handle assembly 2. The second disk member may be integrally formed with the second arm element.

The second disk member may be integrally formed with the second arm element by means of injection molding. The second disk member 300 may be made of a plastic material.

A toothed surface 301 of the second disk member 300 may be provided with radially extending teeth.

The second disk member 300 may have a blind hole 302 or a through hole 302.

As shown in FIGS. 5 and 6, a disk interconnecting member 400 embodied as a rod 400 or bolt 400 is arranged to adjoin the first disk member 200 and the second disk member 300.

A knob 600 may be connected to the rod 400. The rod 400 and the knob 600 may be integrally formed. The knob enables the rod 400 to be readily turned by hand.

The rod extends along an axis of rotation 500 of the handle height adjustment device 100.

The rod 400 is arranged to extend through the hole of the first disk member and the hole of the second disk member.

A first interconnection mechanism 401 is arranged to interconnect the rod 400 and the first disk member 200.

The first interconnection mechanism is configured such that the rod may rotate freely relative to the first disk member, about the axis of rotation 500, whereas it is inhibited from moving axially relative to the first disk member.

The first interconnection mechanism may be a snap-fit mechanism.

The first disk member may have a groove extending around a circumference of the hole, in which groove a flange provided on the rod may run.

A second interconnection mechanism 402 is arranged to threadably interconnect the rod 400 and the second disk member 300.

The second interconnection mechanism may comprise male threads 403 provided on the rod 400 and female threads 404 provided around the circumference of the hole of the second disk member.

FIGS. 9 and 10 schematically illustrate a handle height adjustment device according to embodiments herein. The handle height adjustment device 100 shown in FIG. 9 is in a locked state 700, whereas the handle height adjustment device 100 shown in FIG. 10 is in an open state 800.

Figure 11:
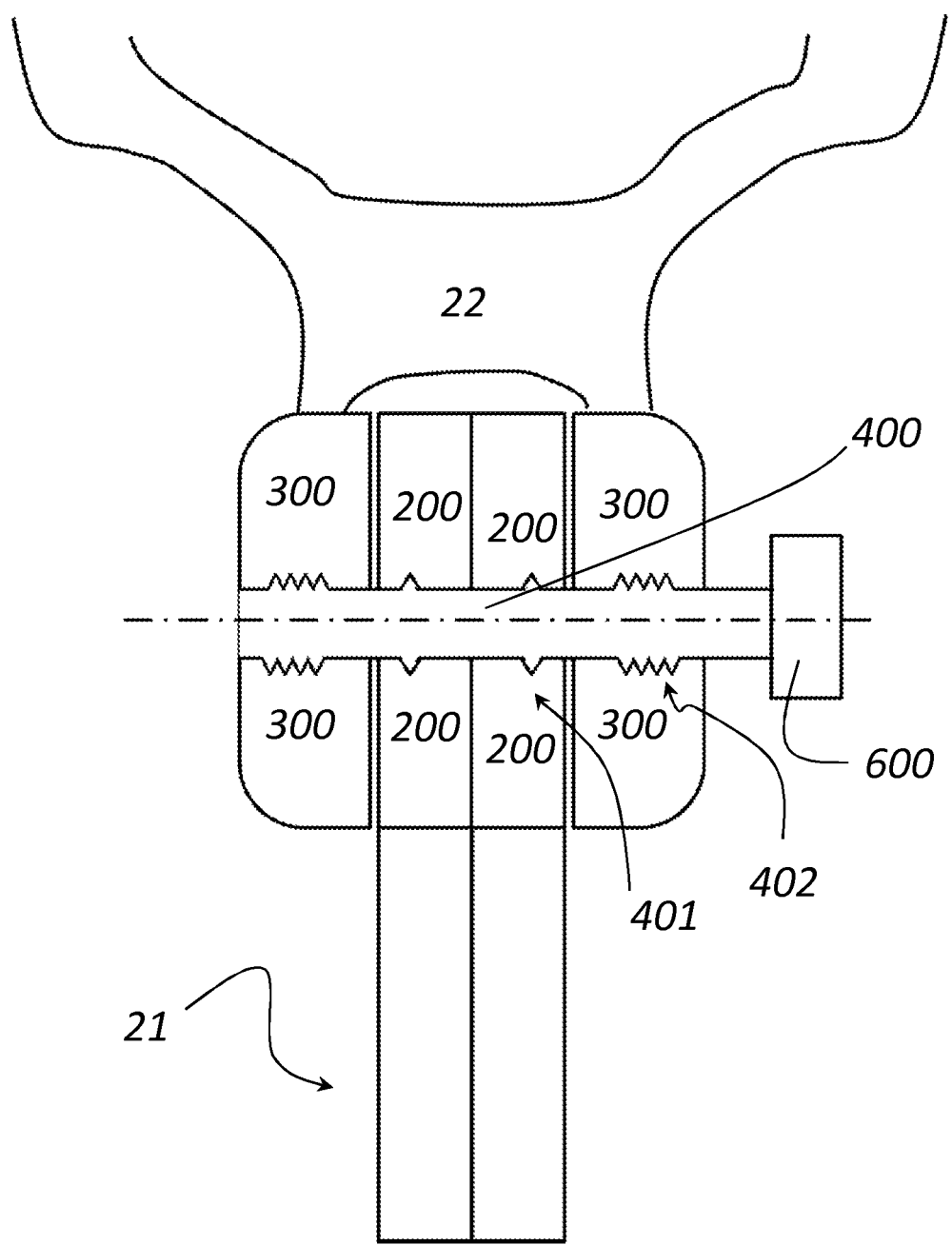
FIG. 11 is a schematic cross sectional view of a handle height adjustment device according to an embodiment of the invention.

As shown in FIGS. 7 and 8, a handle assembly 2 may comprise two handle height adjustment devices 100 sharing one single rod 400. FIG. 11 schematically illustrates a handle assembly comprising two handle height adjustment devices sharing one single rod 400.

In the embodiment shown in FIGS. 4, 7, 8 and 11, the first arm element 21 is part of a lower frame 23 of the handle assembly 2. The second disk member may be integrally formed with the first arm element.

In the embodiment shown in FIGS. 4, 7, 8 and 11, the second arm element 22 is part of an upper frame 24 of the handle assembly 2.

The first disk member 200 has a face surface 201 wherein teeth radially extend from the center of the disk face. The second disk member 300 is arranged to be concentrically joined to the first disk member by the rod 400. The second disk member 300 has a face surface 301 that is a mirror image of the face of the first disk member 200, thereby enabling the face of the first disk member 200 to intermesh with the face of the second disk member 300. Due to the radial pattern of teeth on both the first disk member 200 and the second disk member 300, the two disk members can be intermeshed at numerous points as disk members rotate relative to each other about the axis of rotation 500.

The rod 400 passes through the center of the second disk member 300 and the first disk member 200. As the rod 400 is rotated in a first direction, a clamping force forces the second disk member 300 to intermesh with the first disk member 200 and two disks become firmly affixed together. However, when the rod 400 is loosened by means of rotating it in a second direction—opposite to the first direction, the teeth of the first disk member 200 and the second disk member 300 will separate and the second disk member 300 is free to rotate independently of the first disk member 200.

Rotation of the rod/bolt in the second direction not only releases the clamping force between the first disk member and the second disk member. It also actively separates the first disk member from the first disk member thanks to the threaded interconnection mechanism 402 interconnecting the rod and the second disk member and the first interconnection mechanism adjoining the rod and the first disk member.

Rotation of the rod bolt in a releasing direction forces the second disk member to move axially relative to the rod, whereas the first disk member is inhibited from moving axially relative to the rod thanks to the first interconnection mechanism.

Previously known handle height adjustment devices comprising disk members and an interconnecting rod may be configured such the two disk members may stay in an intermeshed position, although the clamping force is removed. An operator using such a handle height adjustment assembly will have to manually separate the first disk member from the second disk member in order to allow relative rotation between the disk members.

In other previously known handle height adjustment devices an optional spring element is placed between the first disk member 200 and the second disk member 300. The spring element acts to separate the second disk member 300 from the first disk member 200 as the rod 400 is loosened. In a handle height adjustment device according to embodiments herein no such spring element is needed.

According to embodiments herein the knob 600 may push on the second disk member when the rod and the knob are rotated in the first direction.

The handle height adjustment device may also be configured such that the knob pushes on the first disk member when the knob and the rod are rotated in the first direction.

The embodiment shown in FIGS. 4, 7, 8 and 11 works according to the following principle:

The knob 600 and the connecting rod 400 are interconnected by a grip which rotational locks the two parts together, i.e. turning the knob also turns the connecting rod.

By the use of a right-hand thread on one side and a left-hand thread on the other side permits the two second disk members to move axially in opposite directions. This means that the disk members will move either simultaneously outwards or simultaneously inwards.

Accordingly, turning the rod and the knob in the second direction will release the clamping force of booth handle height adjustment devices, so as to move both handle height adjustment devices to their open states 800. Turning the knob and the rod in the first direction will move both handle height adjustment devises to their locked states 700.

The handle height adjustment devices according to embodiments herein may be assembled without any fastening elements.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A handle height adjustment device of a handle assembly of a walk behind power tool, the handle height adjustment device comprising:
   a first toothed disk member arranged to be affixed to a first arm element of the handle assembly,
   a second toothed disk member arranged to be affixed to a second arm element of the handle assembly, a disk interconnecting member extending along an axis of rotation of the handle height adjustment device, the disk interconnecting member being operable to move the handle height adjustment device between a locked state in which the first and second toothed disk members intermesh, and an open state in which the first toothed disk member is rotatable relative to the second toothed disk member about the axis of rotation, wherein rotation of the disk interconnecting member in a first direction about the axis of rotation moves the handle height adjustment device towards the locked state, and wherein rotation of the disk interconnection member in a second direction, opposite to the first direction, moves the handle height adjustment device towards the open state, characterized in that the disk interconnecting member is arranged to be connected to the first toothed disk member by means of a first interconnection mechanism, which first interconnection mechanism inhibits relative movement between the disk interconnecting member and the first toothed disk member along the axis of rotation, and which first interconnection mechanism allows the disk interconnecting member to rotate relative the first toothed disk member about the axis of rotation, and in that;

the disk interconnecting member is arranged to be threadably connected to the second toothed disk member by means of a second interconnection mechanism.

2. A handle height adjustment device according to claim 1, wherein the first interconnection mechanism comprises a snap-fit connection.

3. A handle height adjustment device according to claim 1, wherein the second interconnection mechanism comprises male threads provided on a portion of the disk interconnecting member, and corresponding female threads provided in a hole of the second toothed disk member.

4. A handle height adjustment device according to claim 1, wherein the disk interconnecting member is affixed to a knob.

5. A handle height adjustment device according to claim 4, wherein the disk interconnecting member and the knob are integrally formed.

6. A handle height adjustment device according to claim 1, wherein the first toothed disk member is integrally formed with the first arm element.

7. A handle height adjustment device according to claim 1, wherein the second toothed disk member is integrally formed with the second arm element of the handle assembly.

8. A handle height adjustment device according to claim 1, wherein the first toothed disk member and the first arm element are made from a plastic material.

9. A handle height adjustment device according to claim 1, wherein the second toothed disk member and the second arm element are made from a plastic material.

10. A handle assembly of walk behind power tool, the handle assembly comprising a handle height adjustment device according to claim 1.

11. A handle assembly of claim 10, wherein the handle assembly comprises two handle height adjustment devices, and wherein axes of rotation of the handle height adjustment devices coincides.

12. A handle assembly according to claim 11, wherein the disk interconnecting members of the handle height adjustment devices are integrally formed.

13. A walk behind power tool comprising a handle assembly according to claim 10.

* * * * *

UNITED STATES PATENT AND TRADEMARK OFFICE
CERTIFICATE OF CORRECTION

PATENT NO. : 8,984,718 B2
APPLICATION NO. : 14/355632
DATED : March 24, 2015
INVENTOR(S) : Ejdehag et al.

It is certified that error appears in the above-identified patent and that said Letters Patent is hereby corrected as shown below:

Column 8, Line 11, Claim 6 "with the first arm element." should read --with the first arm element of the handle assembly.--.

Signed and Sealed this
Fifteenth Day of March, 2016

Michelle K. Lee
*Director of the United States Patent and Trademark Office*